(12) United States Patent
Li

(10) Patent No.: US 12,194,892 B2
(45) Date of Patent: Jan. 14, 2025

(54) ELECTRIC VEHICLE BRAKING STRATEGIES FOR MOUNTAIN DRIVING

(71) Applicant: GM Global Technology Operations LLC, Detroit, MI (US)

(72) Inventor: Dongxu Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 17/870,954

(22) Filed: Jul. 22, 2022

(65) Prior Publication Data

US 2024/0025266 A1   Jan. 25, 2024

(51) Int. Cl.
*B60L 7/26* (2006.01)
*B60L 58/14* (2019.01)
*B60T 8/32* (2006.01)

(52) U.S. Cl.
CPC .............. *B60L 7/26* (2013.01); *B60L 58/14* (2019.02); *B60T 8/3215* (2013.01); *B60L 2240/54* (2013.01); *B60T 2201/04* (2013.01); *B60T 2250/04* (2013.01); *B60T 2270/604* (2013.01)

(58) Field of Classification Search
CPC ...... B60L 7/10; B60L 7/18; B60L 7/20; B60L 7/24; B60L 7/26; B60L 15/2009; B60L 15/2018; B60L 50/50; B60L 2260/30; B60L 58/14; B60L 58/15; B60L 2240/12; B60L 2240/421; B60L 2240/423; B60L 2240/54; B60L 2240/642; B60L 2250/10; B60L 2250/16; B60T 7/12; B60T 2250/04; B60T 8/17; B60T 8/24; B60T 8/245; B60T 8/32; B60T 8/3215; B60T 8/54; B60T 8/72; B60T 8/86; B60T 2201/02; B60T 2201/04; B60T 2270/60; B60T 2270/604; B60T 2270/608; B60W 10/18; B60W 10/192; B60W 40/076; B60W 2520/10; B60W 2552/15; B60W 2720/10

See application file for complete search history.

(56) References Cited

U.S. PATENT DOCUMENTS

| | | | |
|---|---|---|---|
| 2009/0227418 A1* | 9/2009 | Farnsworth | B60L 15/2018 477/7 |
| 2011/0049969 A1* | 3/2011 | Park | B60T 13/586 303/3 |
| 2021/0070263 A1* | 3/2021 | Kono | B60T 8/172 |
| 2023/0166601 A1* | 6/2023 | Schneider | B60T 1/10 701/70 |
| 2023/0347872 A1* | 11/2023 | Gesang | B60L 7/18 |

* cited by examiner

*Primary Examiner* — Russell Frejd
*Assistant Examiner* — Brandon Z Willis
(74) *Attorney, Agent, or Firm* — CANTOR COLBURN LLP

(57) ABSTRACT

An electric vehicle, and braking system and a method of operating the electric vehicle. The braking system includes a mechanical braking system, a regenerative braking system, and a controller. The controller is configured to calculate a total braking torque for operating the electric vehicle at a selected velocity during braking, determine an available regenerative braking torque via the regenerative braking system, calculate a mechanical brake torque for the mechanical braking system from the total braking torque and the available regenerative brake torque, and apply the mechanical brake torque at the mechanical braking system.

20 Claims, 5 Drawing Sheets

ELECTRIC VEHICLE BRAKING STRATEGIES FOR MOUNTAIN DRIVING

INTRODUCTION

The subject disclosure relates to a braking system on an electric vehicle and, in particular, to determining an optimal brake actuation strategy in a scenario in which the battery electric vehicle is moving downhill.

In mountain driving, brake failure can occur due to excessive heat generated by braking during a long and steep downhill grade. For a conventional vehicle with an internal combustion engine, the driver can control elements such as original speed, the original gear state (for engine braking) and braking application techniques. However, for battery electric vehicles, engine braking is no longer under the driver's control. Accordingly, it is desirable to provide a control system and method for a battery electric vehicle that prevents brake failure during mountain driving.

SUMMARY

In one exemplary embodiment, a method of operating an electric vehicle is disclosed. A total braking torque for operating the electric vehicle at a selected velocity during braking is calculated. An available regenerative braking torque of the electric vehicle is determined. A mechanical braking torque is calculated from the total braking torque and the available regenerative braking torque. The mechanical braking torque is applied to the vehicle.

In addition to one or more of the features described herein, a battery charging capacity is calculated and the available regenerative braking torque is determined based on the battery charging capacity. The method further includes calculating a safe velocity for the electric vehicle descending a downhill grade and determining the total braking torque for the safe velocity and an available mechanical braking capacity. Wherein when a current velocity of the vehicle is greater than the safe velocity, the method further includes at least one of reducing the velocity of the vehicle autonomously to be equal to or less than the safe velocity and alerting a driver of the vehicle. The method further includes applying one of only the regenerative braking torque to provide the total braking torque and a combination of the regenerative braking torque and the mechanical braking torque to provide the total braking torque. Wherein the vehicle includes a plurality of regenerative braking systems, the method further includes applying the regenerative braking torque using at least one of the regenerative braking systems. The method further includes applying the mechanical braking torque at one of a drive wheel of the vehicle and a drive wheel and a non-drive wheel of the vehicle.

In another exemplary embodiment, a braking system for an electric vehicle is disclosed. The braking system includes a mechanical braking system, a regenerative braking system, and a controller. The controller is configured to calculate a total braking torque for operating the electric vehicle at a selected velocity during braking, determine an available regenerative braking torque via the regenerative braking system, calculate a mechanical braking torque for the mechanical braking system from the total braking torque and the available regenerative braking torque, and apply the mechanical braking torque at the mechanical braking system.

In addition to one or more of the features described herein, the controller is further configured to calculate a battery charging capacity and determine the available regenerative braking torque based on the battery charging capacity. The controller is further configured to calculate a safe velocity for the electric vehicle descending a downhill grade and determine the total braking torque for the safe velocity and an available mechanical braking capacity of the mechanical braking system. Wherein when a current velocity of the vehicle is greater than the safe velocity, the controller is further configured to perform at least one of reducing the velocity of the vehicle autonomously to be equal to or less than the safe velocity and alerting a driver of the vehicle. The controller is further configured to perform one of applying only the regenerative braking torque to provide the total braking torque and applying a combination of the regenerative braking torque and the mechanical braking torque to provide the total braking torque. Wherein the regenerative braking system includes a plurality of regenerative braking systems, the controller is further configured to apply the regenerative braking torque using at least one of the regenerative braking systems. The controller is further configured to apply the mechanical braking torque at one of a drive wheel of the vehicle and a drive wheel and a non-drive wheel of the vehicle.

In yet another exemplary embodiment, an electric vehicle is disclosed. The electric vehicle includes a mechanical braking system, a regenerative braking system, and a controller. The controller is configured to calculate a total braking torque for operating the electric vehicle at a selected velocity during braking, determine an available regenerative braking torque via the regenerative braking system, calculate a mechanical braking torque for the mechanical braking system from the total braking torque and the available regenerative braking torque, and apply the mechanical braking torque at the mechanical braking system.

In addition to one or more of the features described herein, the controller is further configured to calculate a battery charging capacity and determine the available regenerative braking torque based on the battery charging capacity. The controller is further configured to calculate a safe velocity for the electric vehicle descending a downhill grade and determine the total braking torque for the safe velocity and an available mechanical braking capacity of the mechanical braking system. Wherein when a current velocity of the vehicle is greater than the safe velocity, the controller is further configured to perform at least one of reducing the velocity of the vehicle autonomously to be equal to or less than the safe velocity and alerting a driver of the vehicle. The controller is further configured to apply a combination of the regenerative braking torque and the mechanical braking torque to provide the total braking torque. The controller is further configured to perform one of apply only the regenerative braking torque, apply the regenerative braking torque and apply the mechanical braking torque to a drive wheel, and apply the regenerative braking torque and apply the mechanical braking torque to a drive wheel and a non-drive wheel.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
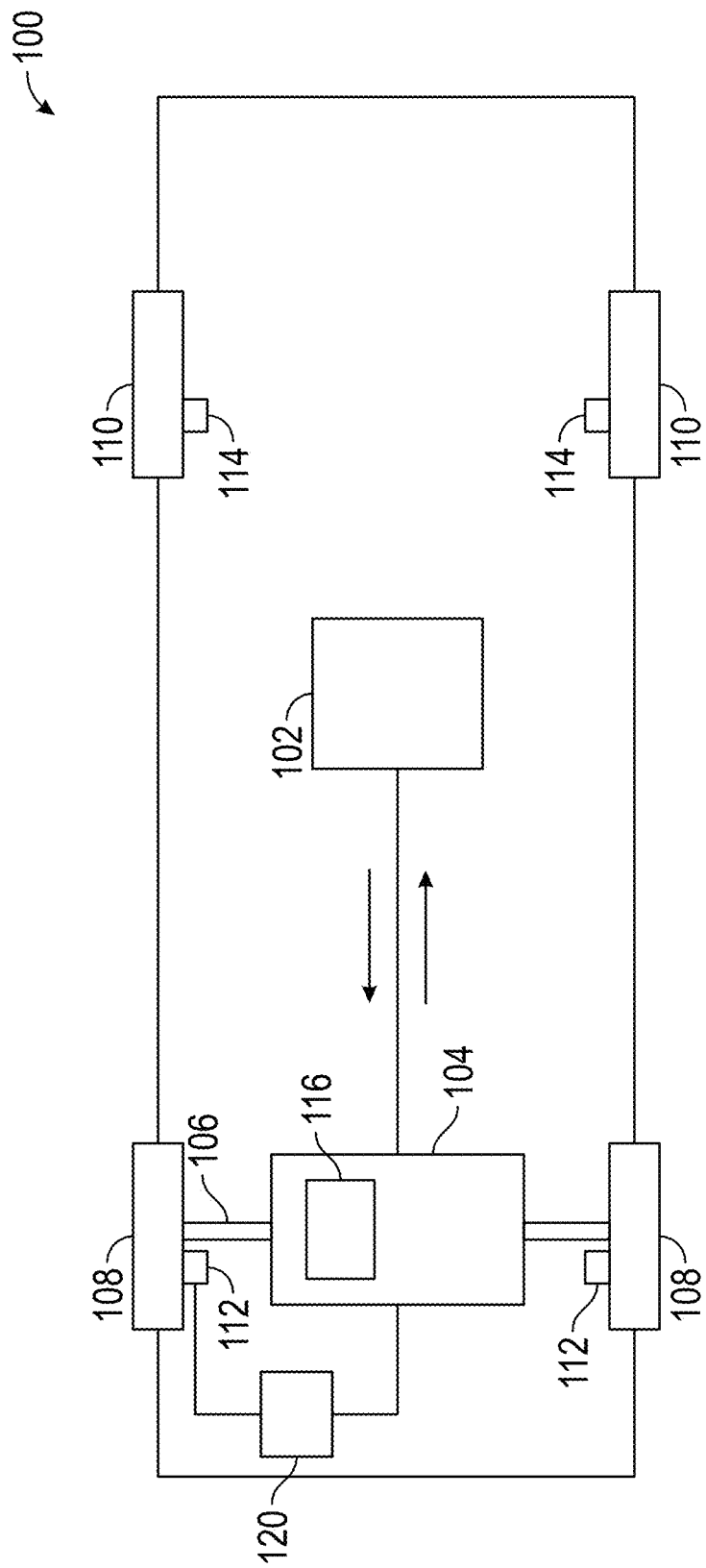
FIG. 1 shows a schematic diagram of an electric vehicle in a plan view.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a schematic diagram of an electric vehicle 100 in a plan view. The electric vehicle 100 includes a power supply 102, such as a battery, and an electric motor 104 which converts power from the battery into kinetic energy in the form of a rotation of an axle 106. The axle 106 connects from the electric motor 104 so that rotation of the axle causes rotation of the rear wheels of the vehicle (also referred to herein as "drive wheels 108"). The electric vehicle 100 also includes non-drive wheels 110, which are generally the front wheels.

The electric vehicle 100 includes a mechanical braking system including two rear wheel brakes 112, one for each of the rear wheels and two front wheel brakes 114, one for each of the front wheels. In addition, the electric motor 104 includes a regenerative braking system 116 that converts, during braking, kinetic energy, or rotational energy of the axle 106 into electrical energy or current which is used recharge the power supply 102.

A controller 120 controls operation of the electric motor 104 and the mechanical braking system. The controller 120 coordinates operation of the mechanical braking system and the regenerative braking system to recuperate the braking energy and prevent failure of the mechanical braking system, in particular, rear wheel brakes 112 and front wheel brakes 114. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 120 may also include a non-transitory computer-readable medium that stores instructions which are processed by one or more processors of the controller to implement processes detailed herein.

Figure 2:
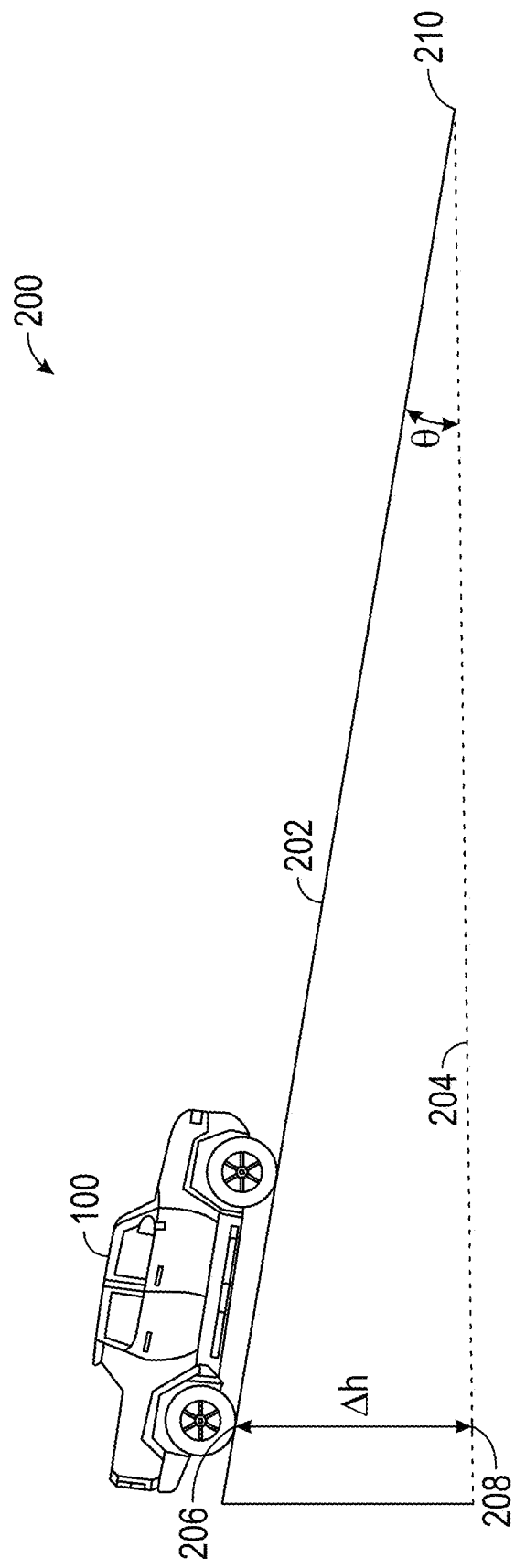
FIG. 2 shows a side view of the vehicle situated at a top of a hill having a downhill grade.

FIG. 2 shows a side view 200 of the electric vehicle 100 situated at a top of a hill 202 having a downhill grade. In various embodiments, the electric vehicle 100 can also refer to a vehicle towing a trailer. The hill 202 forms an angle θ with respect to a horizon indicated by horizontal line 204. The electric vehicle 100 is located at a first location 206 at a vertical height Δh above a bottom 208 of the hill 202. The distance that the electric vehicle 100 travels from the first location 206 to reach a second location 210 horizontally even with the bottom 208 of the hill 202 can be easily determined. The total amount of braking torque required to maintain a vehicle speed that allows the electric vehicle 100 to reach the bottom of the hill 202 is given in Eq. (1):

$$\tau_{Total\_brake} = mg\,\sin(\theta) \times r_{wheel} \qquad \text{Eq. (1)}$$

where m is the mass of the vehicle, g is the acceleration of gravity, and $r_{wheel}$ is the radius of a wheel at which the torque is applied. The mass of the vehicle can be estimated using Eq. (2):

$$m = \tau/a \qquad \text{Eq. (2)}$$

where τ is the currently applied torque and a is the current acceleration of the vehicle.

A braking limit of the mechanical braking system indicates the total amount of braking power that can be applied using the mechanical brakes. An available mechanical braking capacity is a difference between a currently applied braking torque and the braking limit. The maximum power of a mechanical brake for a given vehicle speed v can be determined using a power equation shown in Eq. (3):

$$m_b C \frac{dT}{dt} = P_{brake} - k(v)A(T_{max} - T_{ambient}) \qquad \text{Eq. (3)}$$

where $m_b$ is the mass of the brake, C is a thermal mass of the brake, T is a temperature variable, $P_{brake}$ is the maximum brake power, k(v) is a velocity-dependent coefficient, A is an exposed surface area of the brake, $T_{max}$ is a maximum temperature for the brake, and $T_{ambient}$ is an ambient temperature of the brake.

The brake power is a product of a braking torque τ and an angular velocity ω of the wheel to which the braking torque is applied, as shown in Eq. (4):

$$P_{brake} = \tau\omega(v) \qquad \text{Eq. (4)}$$

where angular velocity ω is a function of vehicle speed v. Given a safe braking power, a maximum safe torque that can be supplied by the mechanical brake is shown in Eq. (5):

$$\tau_{brake}^{safe} = P_{brake}^{safe}/\omega(v) \qquad \text{Eq. (5)}$$

Similarly, the maximum torque that can be safely supplied by a regeneration braking system is shown in Eq. (6):

$$\tau_{regen}^{max} = P_{regen}^{max}/\omega(v) \qquad \text{Eq. (6)}$$

Referring to FIG. 2, the total energy change (or gross energy) that occurs when the vehicle travels form the first location to the second location is given by Eq. (7):

$$\Delta E_{gross} = \frac{1}{2}m(v_{top}^2 - v_{bottom}^2) + mg\Delta h \qquad \text{Eq. (7)}$$

where $v_{top}$ is the velocity of the vehicle at the top of the hill (i.e., first location 206) and $v_{bottom}$ is the velocity of the vehicle at the bottom of the hill (i.e., second location 210). The first velocity $v_{top}$ is a controllable parameter, while the velocity of the vehicle at the bottom of the hill ($v_{bottom}$) can be selected by the driver of the vehicle and should be less than a safe driving speed for the vehicle and less than a safe braking speed based on the available braking capacity of the vehicle.

The total brake energy $E_{total\_brake}$ that is required for travelling from the top of the hill to the bottom of the hill is less than the gross energy due to energy loss from drag forces, as shown in Eq. (8):

$$E_{total\_brake} = \Delta E_{gross} - \int (f_0 + f_1 v + f_2 v^2)v\,dt \qquad \text{Eq. (8)}$$

where $f_0$, $f_1$ and $f_2$ are drag coefficients. This total brake energy is supplied by either the regenerative braking system, the mechanical braking system or a combination of the two.

The regenerative braking system operates by converting the braking energy into electric energy or current that is used to charge the power supply 102. Thus, the amount of braking energy available for braking via the regenerative braking system is limited by the need of the power supply 102 to be regenerated. This is related to the state of charge (SOC) of the battery, as shown in Eq. (9):

$$E_{charging}=E_{full}(1-SOC)=\int P_{regen}^{max}(v)dt \quad \text{Eq. (9)}$$

where $E_{charging}$ is the available regenerative braking energy, $E_{full}$ is the battery capacity. The mechanical braking system provides the braking that is not supplied by the regenerative braking system. Therefore, the required mechanical braking energy is a difference between the total braking over the hill and the available regenerative braking energy, as shown in Eq. (10):

$$E_{mech\_brake}=E_{total\ brake}-E_{charging}/\eta=\int P_{brake}(v)dt \quad \text{Eq. (10)}$$

where $\eta$ is an efficiency of the regenerative charging system.

Figure 3:
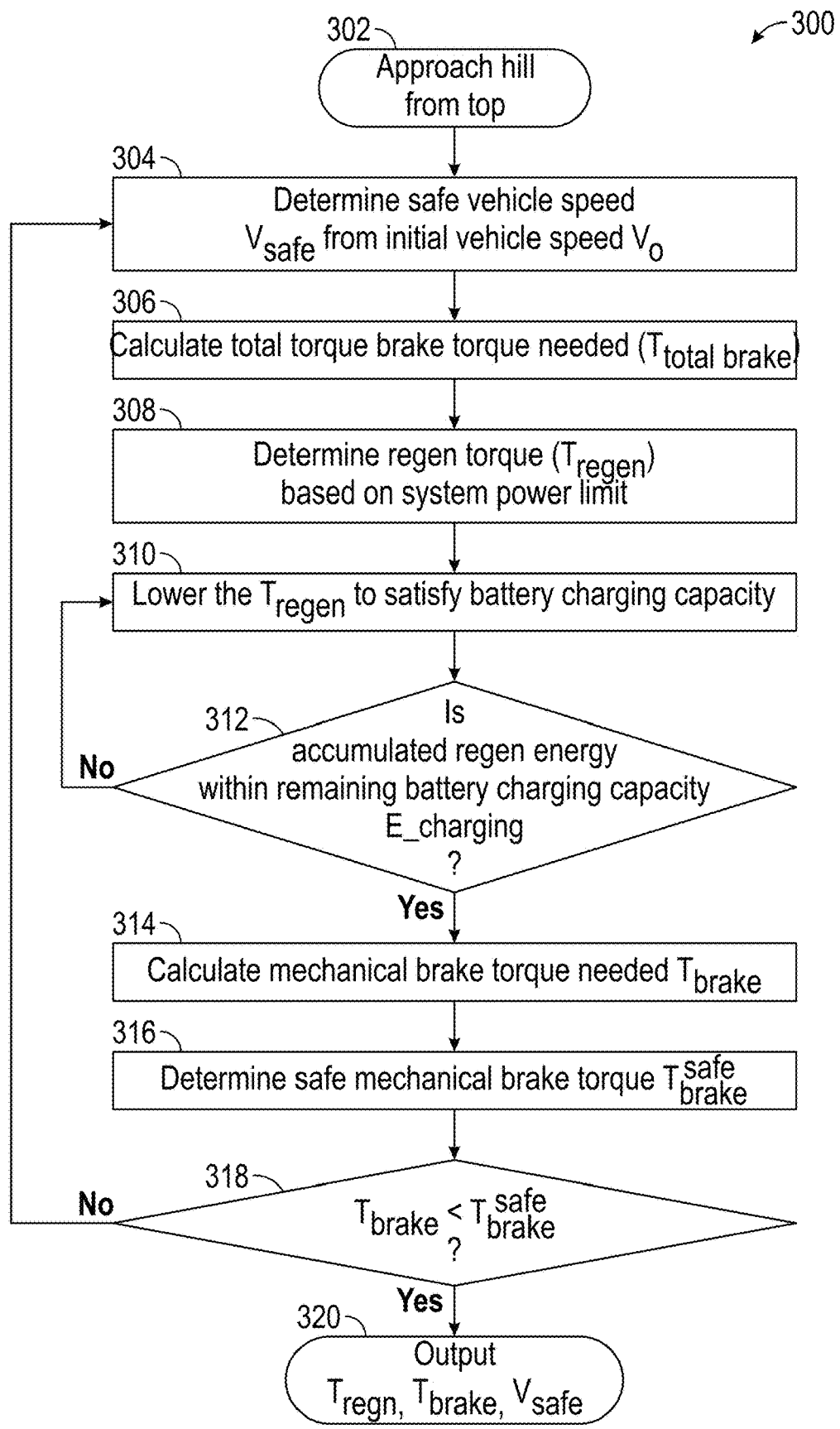
FIG. 3 shows a flowchart of a method for coordinating a mechanical braking system and regenerative braking system to allow the vehicle to move down a hill at a safe speed.

FIG. 3 shows a flowchart 300 of a method for coordinating a mechanical braking system and regenerative braking system to allow the vehicle to move down a hill at a safe speed. In box 302, the vehicle approaches a top of the hill at an initial vehicle speed $v_0$. In box 304, the controller 120 or its processor calculates a safe vehicle speed $v_{safe}$ at which the electric vehicle 100 is to be travelling when it reaches the bottom of the hill, based on the initial vehicle speed $v_0$. The safe vehicle speed $v_{safe}$ can be determine based on information such as a grade of the road, a length of the road, etc. This information can be obtained from a map database. In box 306, the controller 120 calculates a total brake torque $T_{total\_brake}$ required to descend the hill at the safe vehicle speed $v_{safe}$. In box 308, a total regeneration brake torque ($\tau_{regen}$) is determined based on power limits of the electrical system.

In box 310, the regeneration brake torque ($\tau_{regen}$) is lowered or reduced. In box 312, a check is made on the regeneration brake torque as to whether a predicted accumulated regeneration brake energy for the regeneration brake torque is within a limit indicated by the charging capacity of the battery (i.e., as shown in Eq. (9)). If the predicted accumulated regeneration brake energy is greater than a remaining charging capacity for the battery, the method returns to box 310. If the predicted accumulated regeneration brake energy is within the remaining charging capacity for the battery, the method proceeds to box 314.

In box 314, the required mechanical brake torque is calculated based on the regeneration brake torque determined in box 312 (i.e., using Eq. (10)). In box 316, the safe mechanical brake torque $\tau_{brake}^{safe}$ is determined.

In box 316, the mechanical brake torque $\tau_{brake}$ is compared to the safe mechanical brake torque $\tau_{brake}^{safe}$. If $\tau_{brake}<\tau_{brake}^{safe}$, the method returns to box 304. Otherwise, the method proceeds to box 320. In box 320, the regeneration brake torque $\tau_{regen}$, the mechanical brake torque $\tau_{brake}$ and the safe velocity $v_{safe}$ for the vehicle are output to the vehicle. The regeneration brake torque $\tau_{regen}$ and the mechanical brake torque $\tau_{brake}$ are applied at the regenerative braking system and the mechanical braking system, respectively.

Figure 4:
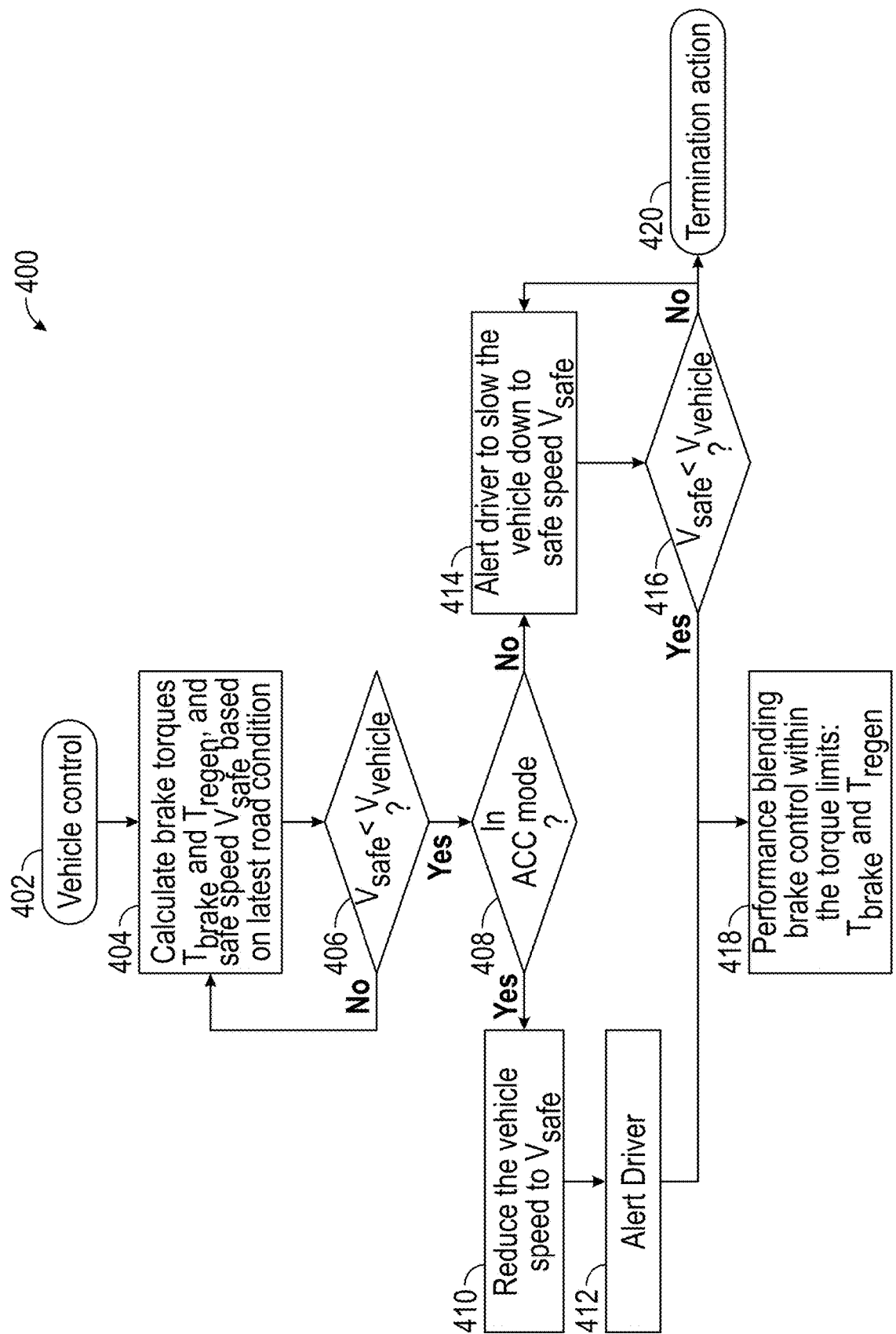
FIG. 4 shows a flowchart of an illustrative method for applying the brakes of the vehicle.

FIG. 4 shows a flowchart 400 of an illustrative method for applying the brakes of the vehicle. The method begins at box 402. In box 404, the mechanical brake torque $\tau_{brake}$ and the regenerative brake torque $\tau_{regen}$ and the safe speed $v_{safe}$ are calculated based on the latest road conditions.

In box 406, a comparison is made between the safe speed and the current speed of the vehicle. If the current speed is less than or equal to the safe speed, the method returns to box 404 for further continuous monitoring, calculation and updating of the brake torques, etc. If the current speed is greater than the safe speed, the method proceeds to box 408. In box 408, the controller 120 determines whether the vehicle is in an adaptive cruise control mode or not. If the vehicle is in the adaptive cruise control mode, the method proceeds to box 410. In box 410, the cruise control reduces the vehicle speed to the safe speed. In box 412, the controller alerts the driver. The method then proceeds to box 418 in which the controller coordinates the braking between the regenerative braking system and the mechanical braking system.

If the vehicle is not in the adaptive cruise control mode, the method proceeds to box 414. In box 414, the driver is alerted to slow the vehicle down to the safe speed. In box 416, another comparison is made between the safe speed and the vehicle speed. If the vehicle speed is less than or equal to the safe speed, the method proceeds to box 418. Otherwise in box 416, if the vehicle speed is greater than the safe speed, the method returns to box 414 to provide a further alert to the driver. The methods may also proceed from box 416 to box 420 in order to terminate the action for a certain numbers of trials or for a period of time. For example, if the driver is non-responsive, an override system can slow down the vehicle or bring it to a stop.

Figure 5:
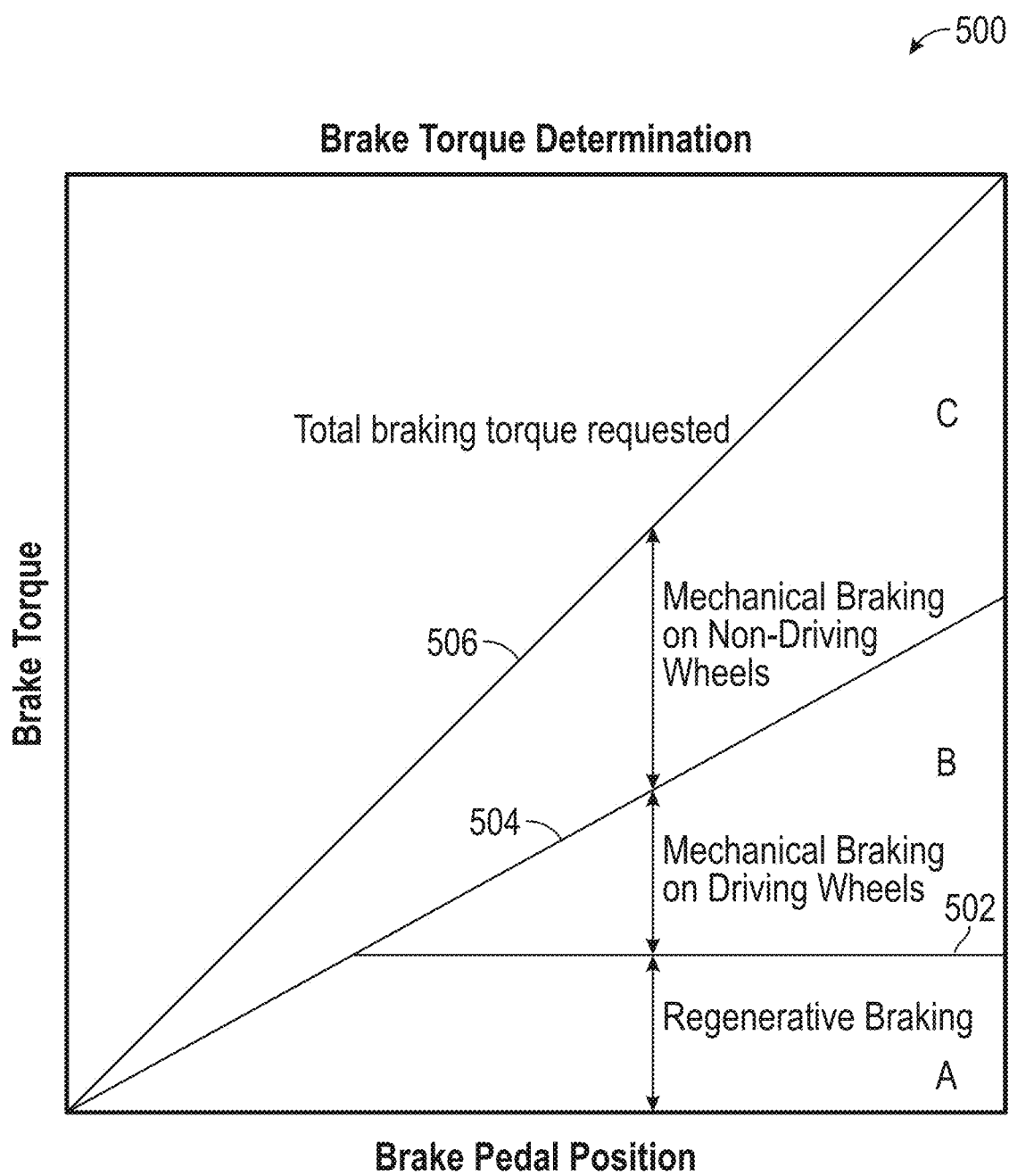
FIG. 5 shows a relation between braking torque and brake pedal force.

FIG. 5 shows an illustrative relation 500 between braking torque and brake pedal force. Brake pedal force ($F_{pedal}$) is shown along the abscissa and braking torque ($\tau_{total\_brake}$) is shown along the ordinate axis. At a given brake pedal force, when the driver applies the brakes, the vehicle employs first a regenerative braking system on the wheels (as shown in region A). When additional braking torque is required (greater than a first braking torque limit 502 of region A), the vehicle employs the additional use of the mechanical braking system at the drive wheels 108 (i.e., rear wheels) as shown in region B. If additional braking torque is required (greater than a second braking torque limit 504), the vehicle additionally employs the mechanical braking system at the non-drive wheels 110 (i.e., front wheels), as shown in region C. The total torque limit 506 for the vehicle is also shown.

In various embodiments, the electric vehicle 100 can include a plurality of motors, each motor having an associated regenerative braking system. The regenerative braking torque can be applied using only one of the regenerative braking systems or a plurality of the regenerative braking systems.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating an electric vehicle, comprising:
   calculating a total braking torque for operating the electric vehicle at a selected velocity during braking;
   determining an available regenerative braking torque of a regenerative braking system of the electric vehicle;
   calculating a mechanical braking torque from the total braking torque and the available regenerative braking torque;

activating a first brake at a drive wheel of the electric vehicle to apply the mechanical braking torque to the electric vehicle when the total braking torque exceeds a first braking torque limit of the regenerative braking system; and activating both the first brake at the drive wheel and a second brake at a non-drive wheel of the electric vehicle to apply the mechanical braking torque at the electric vehicle when the total braking torque exceeds the braking limit of the first brake.

2. The method of claim 1, further comprising calculating a battery charging capacity based on a current state of charge of the battery and determining the available regenerative braking torque based on the battery charging capacity.

3. The method of claim 1, further comprising calculating a safe velocity for the electric vehicle descending a downhill grade and determining the total braking torque for the safe velocity and an available mechanical braking capacity.

4. The method of claim 3, wherein when a current velocity of the vehicle is greater than the safe velocity, further comprising at least one of: (i) reducing the velocity of the vehicle autonomously to be equal to or less than the safe velocity; and (ii) alerting a driver of the vehicle.

5. The method of claim 1, further comprising applying one of: (i) only the regenerative braking torque to provide the total braking torque; and (ii) a combination of the regenerative braking torque and the mechanical braking torque to provide the total braking torque.

6. The method of claim 5, wherein the vehicle includes a plurality of regenerative braking systems, further comprising applying the regenerative braking torque using at least one of the regenerative braking systems.

7. The method of claim 1, further comprising determining the total braking torque based on a drag force on the electric vehicle.

8. A braking system for an electric vehicle, comprising:
a mechanical braking system;
a regenerative braking system; and
a controller configured to:
calculate a total braking torque for operating the electric vehicle at a selected velocity during braking;
determine an available regenerative braking torque via the regenerative braking system;
calculate a mechanical braking torque for the mechanical braking system from the total braking torque and the available regenerative braking torque;
activate a first brake at a drive wheel of the electric vehicle to apply the mechanical braking torque to the electric vehicle when the total braking torque exceeds a first braking torque limit of the regenerative braking system; and
activate both the first brake at the drive wheel and a second brake at a non-drive wheel of the electric vehicle to apply the mechanical braking torque at the electric vehicle when the total braking torque exceeds the braking limit of the first brake.

9. The braking system of claim 8, wherein the controller is further configured to calculate a battery charging capacity based on a current state of charge of the battery and determine the available regenerative braking torque based on the battery charging capacity.

10. The braking system of claim 8, wherein the controller is further configured to calculate a safe velocity for the electric vehicle descending a downhill grade and determine the total braking torque for the safe velocity and an available mechanical braking capacity of the mechanical braking system.

11. The braking system of claim 10, wherein when a current velocity of the vehicle is greater than the safe velocity and the controller is further configured to perform at least one of: (i) reducing the velocity of the vehicle autonomously to be equal to or less than the safe velocity; and (ii) alerting a driver of the vehicle.

12. The braking system of claim 8, wherein the controller is further configured to perform one of: (i) applying only the regenerative braking torque to provide the total braking torque; and (ii) applying a combination of the regenerative braking torque and the mechanical braking torque to provide the total braking torque.

13. The braking system of claim 12, wherein the regenerative braking system comprises a plurality of regenerative braking systems, the controller is further comprising apply the regenerative braking torque using at least one of the regenerative braking systems.

14. The braking system of claim 8, wherein the controller is further configured to determine the total braking torque based on a drag force on the electric vehicle.

15. An electric vehicle, comprising:
a mechanical braking system;
a regenerative braking system; and
a controller configured to:
calculate a total braking torque for operating the electric vehicle at a selected velocity during braking;
determine an available regenerative braking torque via the regenerative braking system;
calculate a mechanical braking torque for the mechanical braking system from the total braking torque and the available regenerative braking torque;
activate a first brake at a drive wheel of the electric vehicle to apply the mechanical braking torque to the electric vehicle when the total braking torque exceeds a first braking torque limit of the regenerative braking system; and
activate both the first brake at the drive wheel and a second brake at a non-drive wheel of the electric vehicle to apply the mechanical braking torque at the electric vehicle when the total braking torque exceeds the braking limit of the first brake.

16. The electric vehicle of claim 15, wherein the controller is further configured to calculate a battery charging capacity based on a current state of charge of the battery and determine the available regenerative braking torque based on the battery charging capacity.

17. The electric vehicle of claim 15, wherein the controller is further configured to calculate a safe velocity for the electric vehicle descending a downhill grade and determine the total braking torque for the safe velocity and an available mechanical braking capacity of the mechanical braking system.

18. The electric vehicle of claim 17, wherein when a current velocity of the vehicle is greater than the safe velocity and the controller is further configured to perform at least one of: (i) reducing the velocity of the vehicle autonomously to be equal to or less than the safe velocity; and (ii) alerting a driver of the vehicle.

19. The electric vehicle of claim 15, wherein the controller is further configured to apply a combination of the regenerative braking torque and the mechanical braking torque to provide the total braking torque.

20. The electric vehicle of claim 15, wherein the controller is further configured to determine the total braking torque based on a drag force on the electric vehicle.

* * * * *